United States Patent
Hong

(10) Patent No.: US 9,297,485 B2
(45) Date of Patent: Mar. 29, 2016

(54) WATER CONNECTING DEVICE

(71) Applicant: Dongbu Daewoo Electronics Corporation, Seoul (KR)

(72) Inventor: Seong Bo Hong, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 84 days.

(21) Appl. No.: 14/136,594

(22) Filed: Dec. 20, 2013

(65) Prior Publication Data

US 2015/0137511 A1 May 21, 2015

(30) Foreign Application Priority Data

Nov. 21, 2013 (KR) .................. 10-2013-0141925

(51) Int. Cl.
 *F16L 19/06* (2006.01)
 *F16L 33/24* (2006.01)
 *F16L 19/08* (2006.01)

(52) U.S. Cl.
 CPC ............... *F16L 33/24* (2013.01); *F16L 19/086* (2013.01)

(58) Field of Classification Search
 CPC ..... F16L 33/222; F16L 33/223; F16L 33/224; F16L 33/23
 USPC .................. 285/243, 322, 323, 324, 342, 343
 See application file for complete search history.

(56) References Cited

U.S. PATENT DOCUMENTS

| 1,066,935 | A | * | 7/1913 | McDaniel | 285/243 |
| 1,788,366 | A | * | 1/1931 | Anderson | 285/324 |
| 2,120,275 | A | * | 6/1938 | Cowles | 285/323 |
| 3,142,500 | A | * | 7/1964 | Wesseler | 285/323 |
| 6,764,107 | B1 | * | 7/2004 | Obahi et al. | 285/322 |
| 7,455,328 | B2 | * | 11/2008 | Chelchowski et al. | 285/323 |
| 8,505,985 | B2 | * | 8/2013 | Nijsen et al. | 285/323 |
| 8,764,069 | B2 | * | 7/2014 | Newall et al. | 285/323 |
| 8,960,729 | B2 | * | 2/2015 | Chiproot | 285/323 |
| 2003/0085566 | A1 | * | 5/2003 | Rex et al. | 285/374 |

FOREIGN PATENT DOCUMENTS

| KR | 20-1999-0016532 | 5/1995 |
| KR | 20-1999-0010213 | 3/1999 |
| KR | 10-1239405 | 3/2013 |

* cited by examiner

Primary Examiner — David E Bochna

(57) ABSTRACT

A connecting device for a washing machine or other apparatuses that connect to a water conduit includes a main body configured to connect to a water supply hose, having a passage through which water passes; a sealing unit in the main body, configured to contact the water conduit; a fixing unit in the main body, fixed to or in contact with an outer surface of the water conduit; and a tightening unit that screws onto the main body, configured to press and/or fix the fixing unit to the water conduit when the tightening unit is tightened. There is no need for a separate tool, because the connecting device is easily and conveniently connected by hand tightening the tightening unit.

12 Claims, 5 Drawing Sheets

WATER CONNECTING DEVICE

CROSS-REFERENCE TO RELATED APPLICATIONS

This application is based on and claims priority from Korean Patent Application No. 10-2013-0141925, filed on Nov. 21, 2013, the disclosure of which is incorporated herein in its entirety by reference.

TECHNICAL FIELD

The present disclosure relates to a water conduit connecting device for a washing machine or other apparatus that connects a water supply hose to a faucet or other conduit.

BACKGROUND

In general, a washing machine is an apparatus that washes clothes using electric power, and performs processes of washing, rinsing, and spin-drying laundry, depending on a predetermined algorithm, to remove dirt and other contaminants from the laundry.

In the washing machine, a water tub that accommodates washing water is in a main body that forms an external appearance of the washing machine. A rotary drum is in the water tub, and a water supply apparatus supplies water to the water tub.

The water supply apparatus includes a water supply hose connected to the water tub to supply water to the water tub, and a water connecting device that fixes or attaches the water supply hose to a faucet.

As disclosed in Korean Patent No. 10-1317306 (Oct. 4, 2013), a water connecting device in the related art includes a coupler that is coupled to a faucet, a connecting socket detachably connected to the coupler, a clamp for caulking that connects the connecting socket and a water supply hose, and an elastic insert between a lower outer circumferential surface of the connecting socket and an inner circumferential surface of the water supply hose. The elastic insert has a partial surface that comes into contact with the clamp for caulking at the outside of the water supply hose.

A tightening screw is at the coupler so that when the tightening screw is tightened, the tightening screw presses against an outer surface of the faucet, and as a result, the connecting device is fixed to the faucet.

However, according to the connecting device in the related art, since the tightening screw is tightened to fix the water supply coupler to the faucet, it is inconvenient to perform work when a plurality of tightening screws needs to be tightened, and since a tool for tightening the tightening screw is required, it is difficult and/or cumbersome to fix the water connecting device to the faucet.

According to the connecting device in the related art, it is difficult to perform work because the connecting device is accurately fixed or attached to the faucet only when all of the tightening screws are tightened to the same degree, and when one or more of the of tightening screws is tightened by a different amount, the water connecting device may be offset with respect to the faucet, and as a result, water leakage may occur.

A hose connector may be disclosed in Korean Patent No. 10-1317306 (Oct. 4, 2013).

SUMMARY

The present disclosure has been made in an effort to provide a connecting device for a washing machine or other apparatus connecting a hose to a faucet or other water conduit just by tightening (e.g., hand tightening) a tightening unit, thereby needing no separate tool and easily and conveniently attaching the hose to the faucet or other water conduit.

The present disclosure has also been made in an effort to provide a connecting device for a washing machine or other apparatus connecting a hose to a water conduit in which when a tightening unit is tightened, a fixing unit is fixed or attached to a faucet, and compression force is applied to a sealing unit to bring the sealing unit into contact with the faucet, thereby preventing water leakage.

One or more exemplary embodiments of the present disclosure provide a connecting device (e.g., for a washing machine), including a main body configured to be connected to a water supply hose, having a passage through which water passes; a sealing unit in the main body, configured to contact a faucet or other water conduit; a fixing unit in the main body, configured to be fixed or attached to an outer surface of the water conduit; and a tightening unit that screws onto the main body, configured to press and fix the fixing unit to an outer surface of the water conduit when the tightening unit is tightened.

An internal thread may be on an open inner surface in the main body, and the internal thread may mate or engage with an external thread on an outer surface of the tightening unit. A hose connector configured to be connected to the water supply hose may be at a side of the main body opposite to that of the tightening unit.

A plurality of projections may be on an outer surface of the main body, to enable a user to grip the main body (e.g., with a hand or fingers).

The sealing unit may be on an inner surface of the main body, and have a circular shape or form with a through hole in a center thereof.

A lower or end surface of the water conduit may contact an upper or exposed surface of the sealing unit. The sealing unit may comprise a rubber material.

The fixing unit may include a supporting member on the upper or exposed surface of the sealing unit, and may have the form of a ring. A plurality of fixing members may be on the supporting member at predetermined intervals, and may be movable (e.g., linearly movable) in a radial direction.

A plurality of slots may be in the supporting member in a radial direction and/or at predetermined intervals along a circumference of the supporting member, and a catching groove may be at one side of the slot or slots.

A guide projection may be in the slot, and a catching projection on one side of the guide projection may be in the catching groove. The guide projection and/or the catching projection may be at or on a lower side or end of the fixing member.

A first inclined surface may be on an outer surface of the fixing member, and a second inclined surface that contacts the first inclined surface may be on an inner surface of the tightening unit.

A plurality of straight-line surfaces may be on an outer surface of the tightening unit in a peripheral direction and/or at predetermined intervals.

As described above, according to the connecting device of the present disclosure, there is no need for a separate tool to connect the hose to the water conduit, and the operation of fixing or attaching the connecting device is easily and conveniently completed just by rotating (e.g., hand tightening) the tightening unit.

According to the connecting device of the present disclosure, when a rotary member is tightened, the tightening unit is fixed to the faucet or other water conduit, and a compression force is applied to the sealing unit so that the sealing unit contacts with the water conduit (e.g., an outer surface of the faucet), thereby preventing water leakage.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
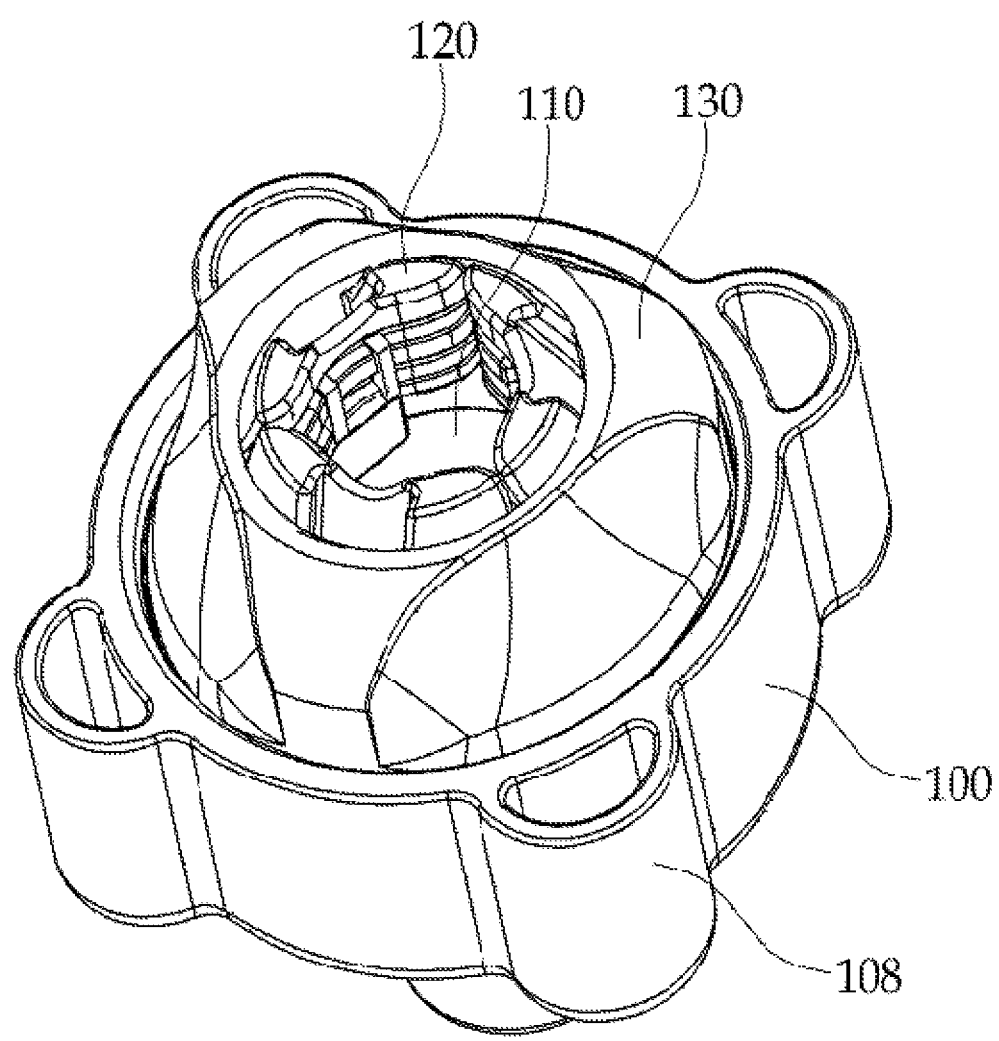
FIG. 1 is a perspective view of an exemplary connecting device according to one or more embodiments of the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, one or more embodiments according to the present disclosure will be described in detail with reference to the accompanying drawings. In this process, sizes or shapes of constituent elements illustrated in the drawings and the like may be exaggerated for clarity and ease of description. The drawings are schematic and are not necessarily dimensionally illustrated. A predetermined size is just exemplary and not limiting. Terms may be defined in consideration of configurations and operations of the present disclosure, but their meanings may vary depending on the intention or usual practice of a user or an operator. These terms should be defined based on the content throughout the present specification.

As those skilled in the art will realize, the described exemplary embodiments may be modified in various different ways, all without departing from the spirit or scope of the present disclosure, which is not limited to the exemplary embodiments described herein. A configuration and an operational effect according to exemplary configurations of the present disclosure will be clearly understood through the detailed description below. Like reference numerals designate like elements throughout the specification and drawings. A detailed explanation of known related functions and constitutions may be omitted when the detailed explanation obscures the subject matter of the present disclosure.

The exemplary embodiments of the present disclosure illustrate ideal exemplary embodiments of the present disclosure in more detail. As a result, various modifications of the drawings are expected. Accordingly, the exemplary embodiments are not limited to a specific form of the illustrated region, and for example, include a modification of a form by manufacturing.

Figure 2:
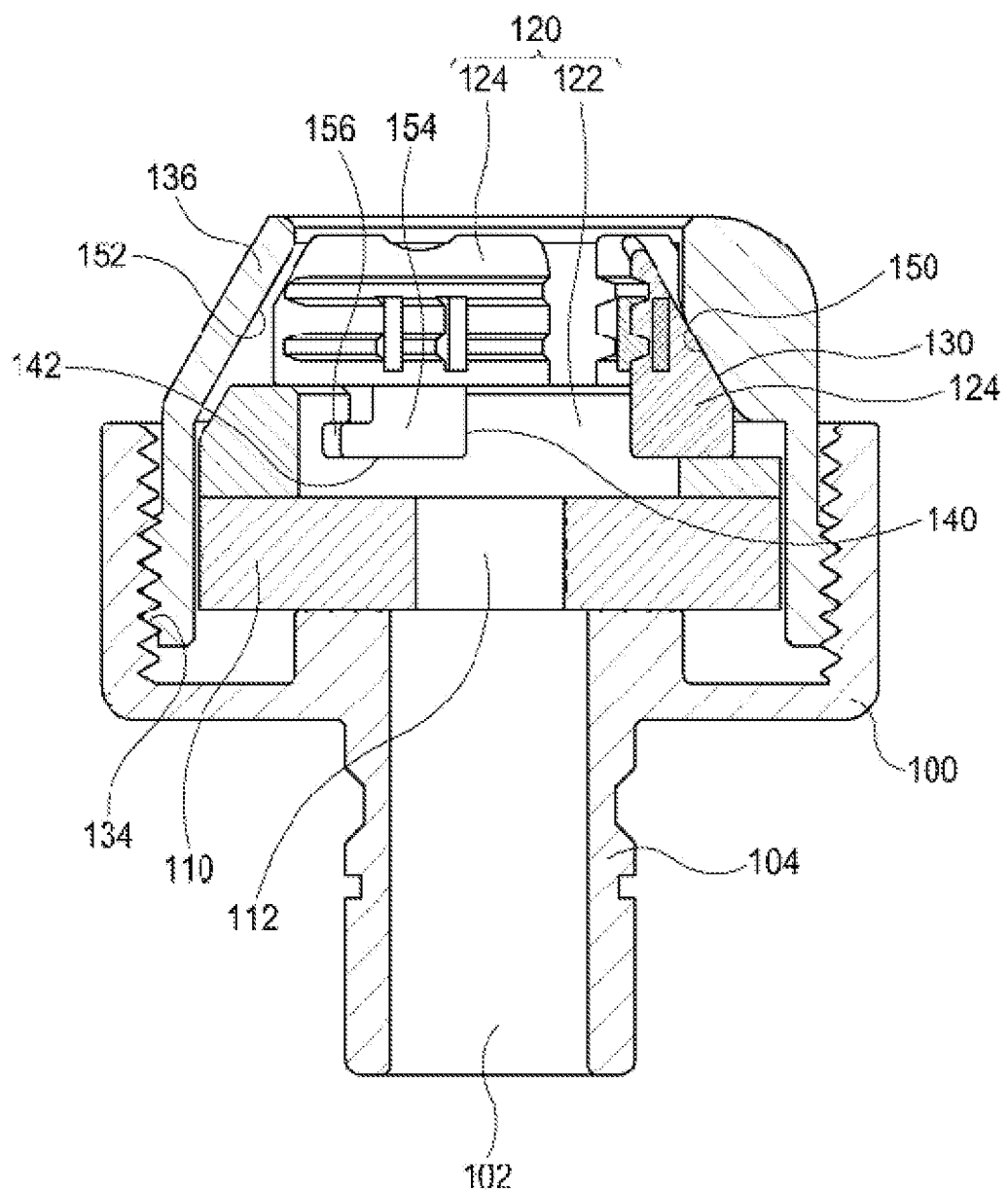
FIG. 2 is a cross-sectional view of the exemplary connecting device according to embodiment(s) of the present disclosure.

FIG. 1 is a perspective view of an exemplary connecting device according to one or more embodiments of the present disclosure, and FIG. 2 is a cross-sectional view of the exemplary connecting device according to embodiment(s) of the present disclosure.

An exemplary connecting device according to embodiments of the present disclosure includes a main body 100 which is to be connected to a water supply hose, a sealing unit 110 in the main body 100 and that is configured to contact a faucet or other water conduit, a fixing unit 120 configured to be attached, sealed or fixed to an outer surface of the water conduit (e.g., faucet), and a tightening unit 130 that screws onto or into the main body 100, and is configured to press and/or fix the fixing unit 120 to the outer surface of the water conduit (e.g., faucet) when the tightening unit 130 is tightened. While the exemplary connecting device is described herein as being useful for connecting a water supply hose of a washing machine to a faucet, it is generally useful for connecting any hose to any substantially round or cylindrical water conduit, such as a faucet, a pipe, another hose, a tube, etc.

A passage 102 through which water passes is in a center of the main body 100, a hose connector 104 to which the water supply hose is connected is at one (e.g., a lower) side or end of the main body 100, and an internal thread into which the tightening unit 130 fits is in an open (e.g., upper) side and/or inner surface of the main body 100.

A plurality of projections or bumps 108 are on an outer surface of the main body 100, generally at predetermined intervals, so that the user can conveniently grip the main body 100 with his or her hand or fingers.

The sealing unit (or washer or gasket) 110 may have a circular or disc shape and a through hole 112 through a center thereof that communicates with the water passage 102. The sealing unit 110 is on an inner surface of the main body 100, and an end or lower surface of the water conduit (e.g., faucet) is configured to contact an exposed (e.g., upper) surface of the sealing unit 110 to prevent water leakage. The end of the faucet or other water conduit may not actually contact the sealing unit 110, but the exemplary connecting device may still function in such a case. The sealing unit 110 may comprise a rubber material.

The fixing unit 120 includes a supporting member 122 on the exposed (e.g., upper) surface of the sealing unit 110. The fixing unit 120 may have a circular, annular or ring shape. In various embodiments, a plurality of fixing members 124 are on the supporting member 122 along its circumference at predetermined intervals. The fixing members 124 may be on the supporting member 122 in locations corresponding to (e.g., under) the three projections or extensions in or on the tightening member 130 that enable the user to grip the tightening member 130. There may be more (e.g., 4, 5, 6, etc.) or fewer (e.g., 2) fixing members 124 and/or projections or extensions in or on the tightening member 130, in accordance with design choices by the manufacturer. The fixing members 124 may move linearly along the radius of the connection device (e.g., in a radial direction, towards the center), and contact (or be fixed or attached to) the outer surface of the faucet.

The supporting member 122 may have a plurality of slots 140 in a radial direction and/or along a circumference thereof at predetermined intervals. The fixing members 124 are generally placed or inserted into the slots 140 to enable them to be linearly movable (e.g., towards the center of the connection device). However, if the fixing members 124 (and optionally the supporting member 122) comprise or are made from a watertight, pliable material (e.g., rubber, silicone, etc.), the fixing members 124 can simply bend towards the center of the connection device when the tightening unit 130 is tightened onto or into the main body 100.

A catching groove 142 may be formed in or extend from the slot 140, and a catching projection 156 on the fixing member 124 may fit in or be inserted into the catching groove 142 so that the fixing member 124 does not move away from the supporting member 122.

An inner surface of the fixing member 124 may have a curve or arc, and may be uneven to enable close contact with the outer surface of the faucet. An outer surface of the fixing member 124 may comprise a first inclined surface 150, and the first inclined surface 150 contacts a second inclined surface 152 on an inner surface of the tightening unit 130. As a result, when the tightening unit 130 is tightened and moves down, the second inclined surface 152 slides along the first inclined surface 150 and pushes the fixing members 124 in the radial direction towards the center of the connection device.

The fixing members 124 directly press against the faucet or other water conduit, and thus may comprise a metal or alloy.

A guide projection 154, which may be in the slot 140 and/or move along the slot 140, is at a side or end of the fixing member 124 closest to the sealing unit 110 (e.g., a lower side of the fixing member 124), and the catching projection 156 in the catching groove 142 may be on one side of the guide projection 154.

The number of fixing members 124 may be three, and the fixing members 124 may be arranged at an interval of 120°. However, other arrangements are also suitable for and contemplated by the present disclosure.

An external thread 134 screws into the internal thread of the main body 100, and is on an outer surface of the tightening unit 130, at an end or side inserted into the main body 100. The second inclined surface 152, which contacts the first inclined surface 150 of the fixing member 124, is on an inner surface of the tightening unit 130, at an end or side away from the main body 100.

A plurality of substantially straight or planar surfaces 136 may be on the outer surface of the tightening unit 130 at predetermined intervals along the periphery and/or outer circumference of the tightening unit 130, to enable the user to grip the tightening unit 130 and/or straight or planar surfaces 136 with his or her hand or fingers, and conveniently rotate (e.g., tighten and/or loosen) the tightening unit 130.

The connecting device according to exemplary embodiments of the present disclosure may be connected to water conduits having various sizes.

Figure 3:
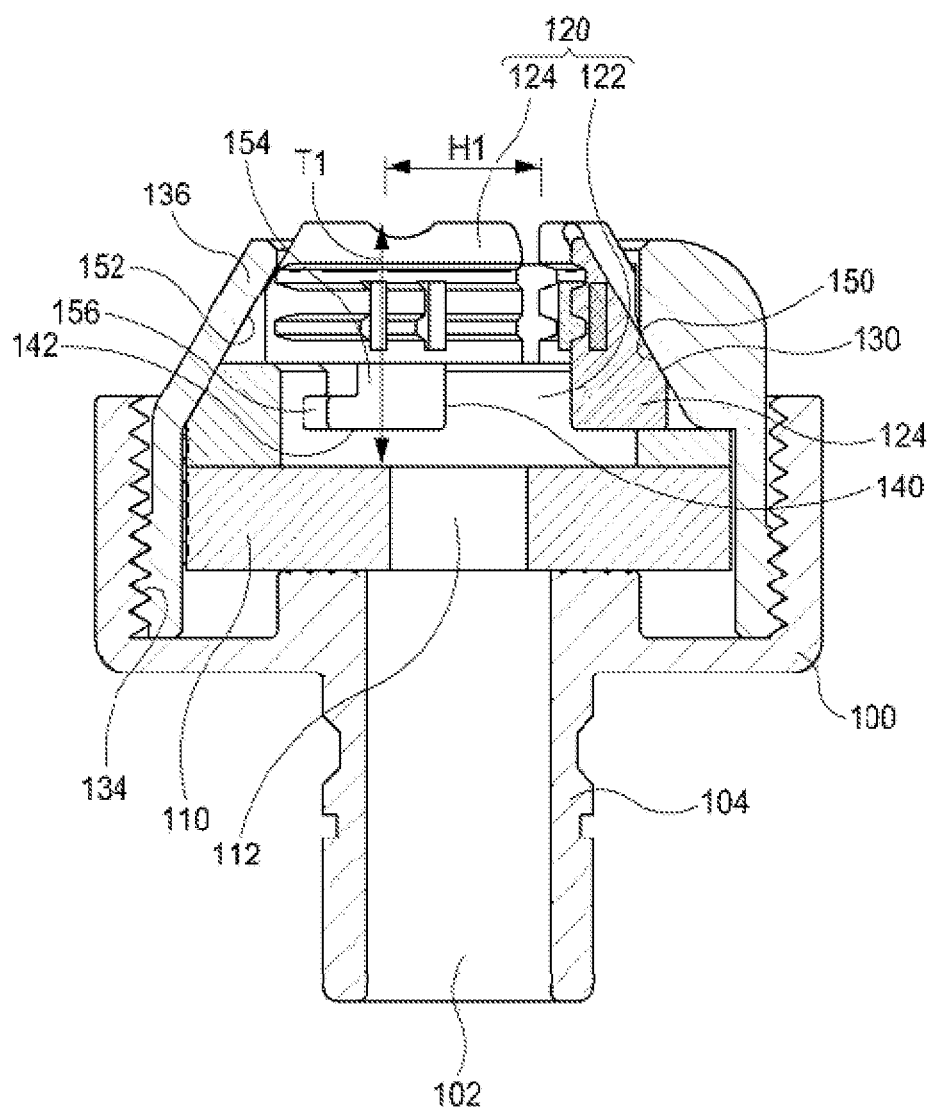
FIGS. 3 to 5 are operational state views of the exemplary connecting device according to embodiment(s) of the present disclosure.

For example, as illustrated in FIG. 3, in a case in which the diameter H1 of the faucet is 13 mm, the tightening unit 130 is maximally tightened (e.g., inserted into the main body 100), and an allowable height, interval or distance T1 between the upper exposed surface of the sealing unit 110 and an end or outermost surface of the fixing member 124 is 14 mm.

Figure 4:
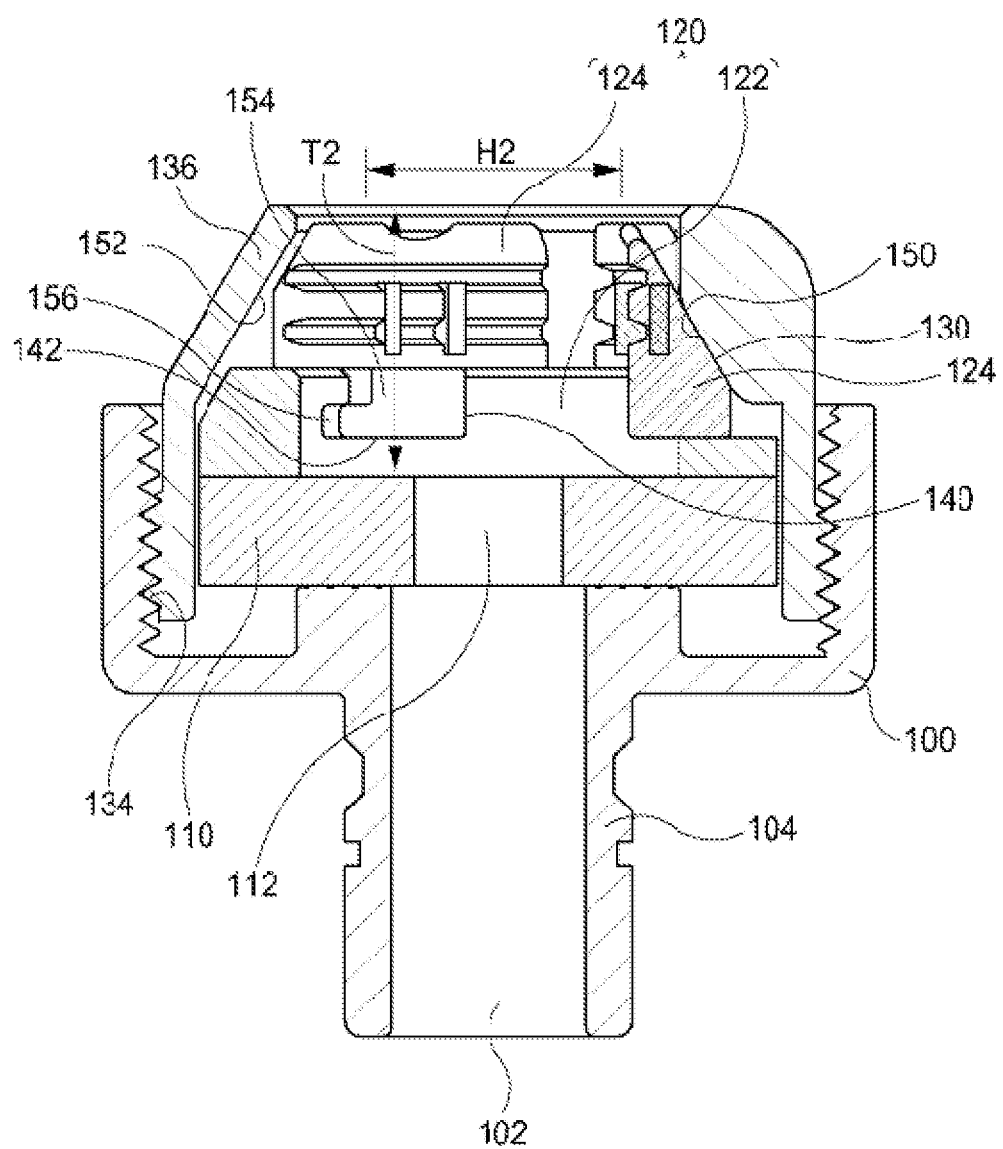

As illustrated in FIG. 4, in a case in which the diameter H2 of the faucet is 15 mm, the tightening unit 130 is tightened to a middle degree, and an allowable height, interval or distance T2 between the upper/exposed surface of the sealing unit 110 and the upper end or outermost surface of the fixing member 124 is 15 mm.

Figure 5:
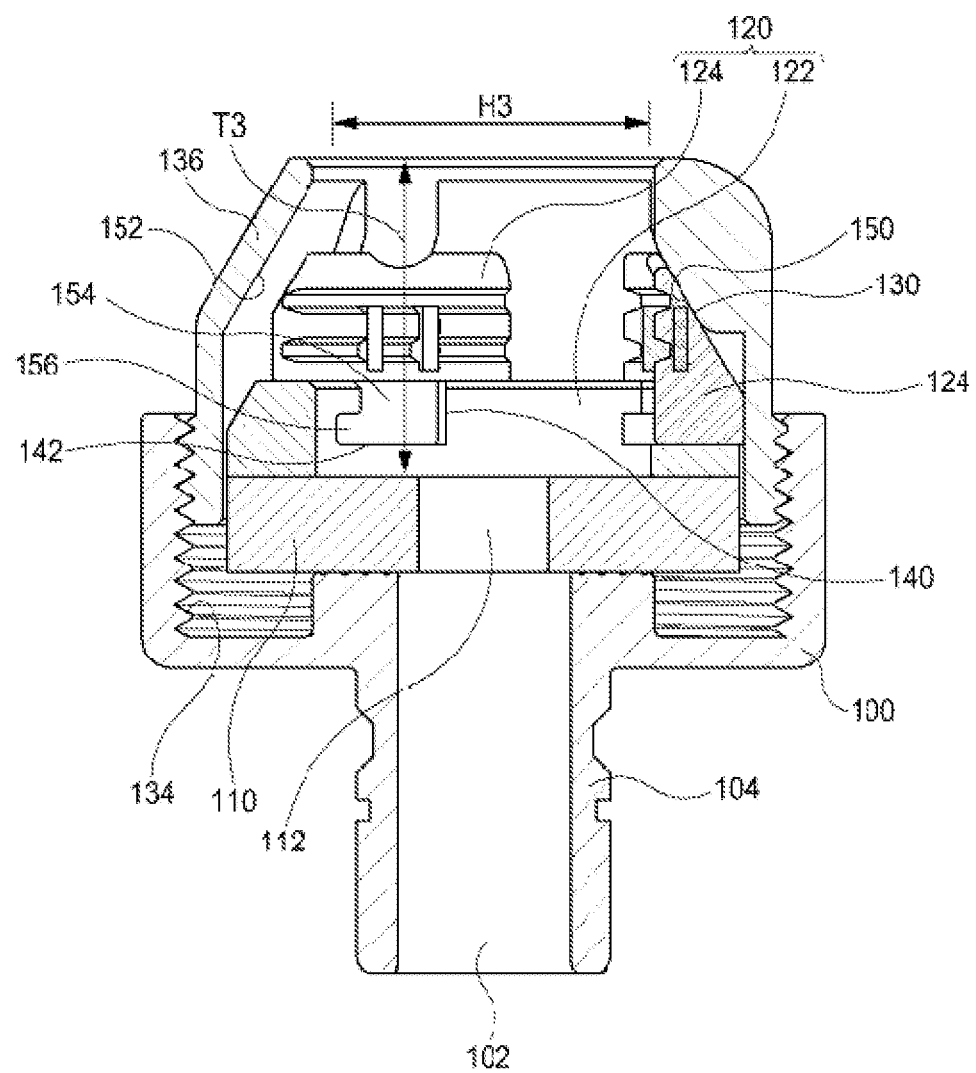

As illustrated in FIG. 5, in a case in which the diameter H3 of the faucet is 20 mm, the tightening unit 130 is screwed into the outermost threads of the main body 100, and an allowable height, interval or distance T3 between the upper/exposed end of the sealing unit 110 and outermost surface of the fixing member 124 is 20 mm.

An exemplary operation of the connecting device according to embodiments of the present disclosure, configured as described above, will be described below.

When the water conduit (e.g., faucet) is inserted into the connecting device, the end or lower surface of the faucet contacts the exposed or upper surface of the sealing unit 110. In this state, when the tightening unit 130 is rotated in a direction that tightens the tightening unit 130, the tightening unit 130 moves into the main body 100 (e.g., down), and the second inclined surface 152 of the tightening unit 130 pushes the fixing member 124 towards the center of the connection device (e.g., in the radial direction). Then, the inner surfaces of the fixing members 124 press against the outer surface of the water conduit (e.g., faucet or pipe) to fix or attach the connecting device to the water conduit.

When the tightening unit 130 enters into the main body 100, force is also applied to the fixing members 124 in a direction towards the sealing unit 100, thereby pushing or forcing the water conduit fixed to or in contact with the fixing members 124 towards the sealing unit 110, and increasing the contact force between the water conduit and the sealing unit 110, thereby improving the seal and/or further preventing water leakage.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A connecting device, comprising:
a main body configured to be connected to a hose, having a passage through which water passes;
a sealing unit in the main body, configured to contact a water conduit;
a fixing unit configured to be fixed to an outer surface of the water conduit; and
a tightening unit that surrounds the fixing unit and screws onto the main body, configured to press and/or fix the fixing unit to the outer surface of the water conduit when the tightening unit is tightened,
wherein the fixing unit includes a supporting member on an exposed surface of the sealing unit, and having a ring shape or form, and a plurality of fixing members on the supporting member at predetermined intervals that are movable in a radial direction,
wherein the supporting member comprises a plurality of slots in a radial direction at predetermined intervals along a circumference thereof
wherein the each slot includes a catching groove at one side of the slot, and
wherein the fixing member comprising a guide projection in the slot, at a lower side of the fixing member, and a catching projection on one side of the guide projection and in the catching groove, at the lower side of the fixing member.

2. The connecting device of claim 1, comprising an internal thread on an inner surface the main body, wherein the internal thread mates with an external thread on an outer surface of the tightening unit.

3. The connecting device of claim 1, further comprising hose connector at a side or end of the main body opposite to the tightening unit.

4. The connecting device of claim 1, further comprising a plurality of projections are on an outer surface of the main body.

5. The connecting device of claim 4, wherein the plurality of projections enable a user to grip the main body.

6. The connecting device of claim 1, wherein the sealing unit is on an inner surface of the main body, and has a circular shape with a through hole in a center thereof.

7. The connecting device of claim 4, wherein the sealing unit has an upper surface configured to contact a lower or end surface of the water conduit.

8. The connecting device of claim 1, wherein the sealing unit comprises a rubber material.

9. The connecting device of claim 1, wherein the fixing member includes a first inclined surface on an outer surface thereof, and the tightening unit includes a second inclined surface configured to contact the first inclined surface on an inner surface thereof.

10. The connecting device of claim 1, wherein the tightening unit comprises a plurality of substantially straight or planar surfaces at predetermined intervals on an outer surface thereof.

11. The connecting device of claim 1, wherein the water conduit comprises a faucet, a pipe, or a hose.

12. A washing machine, comprising the connecting device of claim 1.

* * * * *